Patented Feb. 1, 1949

2,460,565

UNITED STATES PATENT OFFICE 2,460,565

VAPOR PHASE CHLORINATION OF PHTHALIC ANHYDRIDE

Thad M. Amacker, Baton Rouge, La., assignor to The B. F. Goodrich Company, New York, N. Y., a corporation of New York No Drawing. Application September 11, 1946, Serial No. 696,377

4 Claims. (Cl. 260—341)

This invention relates to the chlorination of phthalic anhydride and more specifically pertains to the vapor phase chlorination of phthalic anhydride in the presence of a catalytic composition.

Heretofore, phthalic anhydride has been chlorinated in the molten state by bubbling elemental chlorine into molten phthalic anhydride containing iron chloride as a catalyst. In this process the phthalic anhydride sublimes at the reaction temperature and a reflux condenser must be employed to prevent excessive losses of the anhydride. The cooled anhydride solidifies on the condenser walls and the solid material is generally removed by various complicated mechanical scraping devices. When these liquid phase chlorination processes are employed, a mixture of the mono-, di-, tri-, and tetra-chlorophthalic anhydrides are produced.

I have discovered that phthalic anhydride can be successfully and efficiently chlorinated in the vapor phase to the monochloro derivative by a method which comprises passing a mixture containing elemental chlorine and vaporous phthalic anhydride through a heated reaction chamber containing a catalyst comprising a solid polyvalent metal chloride which is physically and chemically unchanged (that is, it does not boil, sublime or decompose) at the temperature of chlorination. In this manner, phthalic anhydride can be instantaneously chlorinated to produce high yields of the monochlorophthalic anhydride derivative in a high degree of purity.

Solid polyvalent metal chlorides such as ferric chloride, cupric chloride, thorium chloride, calcium chloride, platinum chlorides, chromium chlorides, and other solid polyvalent metal chlorides which remain physically and chemically unchanged at temperatures in excess of about 250° C., either as such or supported on pumice or silica gel or other carrier, are effective catalysts for the chlorination.

The temperature at which the vapor phase chlorination is carried out is dependent in part upon the activity and stability of the metal chloride catalyst and in part upon the temperature at which phthalic anhydride is oxidized in the presence of chlorine. When substantially one molecular equivalent of chlorine is used for each molecular equivalent of anhydride, as is preferred since the product then consists substantially of the monochloro derivative, oxidation of the anhydride does not occur to any substantial extent when temperatures in the range of about 250 or 260° C. (the lowest temperature at which the mixture of reactants is vaporous) to about 400° C., are used. Accordingly, the use of temperatures within the range, especially temperatures from about 280 to 370° C., is preferred. An excess of chlorine over that required to form the monochloro derivative may also be used if it is desired to prepare a mixture of mono-, di-, tri- and tetrachlorophthalic anhydrides and in this event, temperatures in the range of 250 to 400° C. may also be used but it is desirable to dilute the reactants with an inert gas such as nitrogen in such a chlorination, in order to prevent undesirable oxidation.

The preferred method of performing my invention is to chlorinate phthalic anhydride to mono-chlorophthalic anhydride without the use of an inert gas in the presence of a catalyst comprising ferric chloride, cupric chloride or thorium chloride or a mixture of two or more of these, thorium chloride being the particularly preferred catalyst. These metal chlorides bring about the most efficient chlorination to the mono-chloro product. The temperatures at which these catalysts are preferably employed are within the range of about 250, or more preferably 280° C., to about 400° C., depending upon the stability of the metal chloride; when ferric chloride is employed as the chlorination catalyst, the chlorination temperature is preferably below 300° C. (since 315° C. is the boiling point of ferric chloride) but when thorium chloride or cupric chloride is used the most desirable temperature is about 300 to 400° C.

The following specific examples of preferred procedures illustrate the invention in greater detail, but it will be understood that the invention is not limited thereto.

Example I

Thorium chloride catalyst was prepared by soaking finely-divided pumice in a saturated aqueous solution of thorium nitrate. The water was then evaporated at 150–170° C. in an oven until the pumice was dry and then the nitrate-coated pumice was heated at 200° C. until the evolution of nitrogen oxides had ceased. The coated pumice was then packed in a glass tube having an outside diameter (O. D.) of 24 m. m. and a length of 36 in. The entire tube was heated slowly from 100° C. to about 350° C. and maintained at 350° C. until the nitrate was converted to the oxide after which the tube and its contents were flushed with nitrogen. The thorium oxide was then converted to the chloride by passing dry carbon tetrachloride through the bed of coated pumice while maintaining the temperature of the coated pumice at about 400° C. One end of the catalyst tube was connected to a water-cooled receiving vessel and the other end was connected to a mixer to which vaporous chlorine and vaporous phthalic anhydride could be supplied. The catalyst tube was heated to about 360° C. and a gaseous mixture containing about equimolecular portions of phthalic anhydride and chlorine were then passed through the catalyst bed of thorium chloride supported on pumice. Under these conditions a chlorinated product was produced at the rate of about 100 grams per hour and the efficiency of the process was about 96% based on the phthalic anhydride used. The product contained about 20% chlorine, had a set point of 52° C. and was free of thorium chloride, these properties showing that the product was mono-chlorophthalic anhydride of high degree of purity.

*Example II*

The chlorination was carried out in the same manner as in Example I, but the temperature of the catalyst chamber was maintained at 340° C. The product, monochlorophthalic anhydride, contained about 19% chlorine, had a set point of about 55° C. and was free of thorium chloride. Under these conditions the monochlorophthalic anhydride was produced at a rate of about 40 grams per hour at an efficiency of about 95%.

*Example III*

A 24 m. m. O. D. glass tube 36 inches long was packed with a catalyst consisting of pumice coated with ferric chloride. A gaseous mixture of equimolecular proportions of phthalic anhydride and chlorine was passed through the catalyst tube while the catalyst bed was maintained at about 260° C. Monochlorophthalic anhydride was produced with a chlorine content of about 20%, at a rate of about 45 grams per hour, and at an efficiency of about 80%. The product contained a small amount of ferric chloride, which had vaporized during the reaction.

*Example IV*

A 24 m. m. O. D. glass tube 36 inches long was packed with a catalyst consisting of pumice coated with cupric chloride, and a gaseous mixture of equimolecular proportions of phthalic anhydride and chlorine was passed over the catalyst while maintaining its temperature at about 360° C. Under these conditions monochlorophthalic anhydride was produced at a rate of about 144 grams per hour and the product had a chlorine content of about 19%. An analysis of the product showed an absence of copper.

*Example V*

A 24 m. m. O. D. glass tube 36 inches long was packed with pumice coated with a mixture of 90 to 95% cupric chloride and 5 to 10% ferric chloride. A gaseous mixture of equimolecular proportions of phthalic anhydride and chlorine was passed through the tube while the temperature of the catalyst bed was maintained at about 280° C. The first portion of chlorinated phthalic anhydride formed contained some ferric chloride, but, after about one hour of operation, the amount of ferric chloride in the product was negligible and the reaction proceeded at a rate of about 165 grams of product per hour. The product consisted of monochlorophthalic anhydride having a chlorine content of 19 to 20%.

Other metal chlorides which will meet the requirements hereinbefore set forth will also successfully catalyze the chlorination of phthalic anhydride. It will be understood that the specific conditions of operation may vary from those of the above specific examples for each metal chloride or combination of metal chlorides employed, but such variations are within the scope of my invention.

The monochlorophthalic anhydride produced in accordance with Examples I to V is of such a high degree of purity that it may be used to prepare esters of monochlorophthalic acid which are completely colorless. Such esters are excellent plasticizers for polyvinyl chloride and other plasticizable materials. When phthalic anhydride is chlorinated by the methods heretofore known, however, and the product used to prepare chlorophthalate esters, such esters are discolored and are of lesser value as plasticizers.

Moreover, the disclosed process for chlorinating phthalic anhydride is also vastly superior to and more economical than known processes, for the reason that the catalysts may be used many times without regeneration. Even after their activity has diminished, as by hydrolysis of the metal chloride to the oxide, they may be regenerated for further use by passing anhydrous hydrogen chloride or carbon tetrachloride over the partially depleted catalyst.

Although I have herein described specific examples of my invention, I do not desire nor intend to limit myself solely thereto, for numerous variations may be effected therein without departing from the spirit and scope of the invention as defined in the appended claims.

I claim:

1. A process for producing monochlorophthalic anhydride which comprises passing a gaseous mixture of substantially equimolecular proportions of phthalic anhydride and chlorine over a catalyst at a temperature in the range of about 250 to 400° C., the said catalyst comprising a solid polyvalent metal chloride selected from the group consisting of thorium chloride, cupric chloride, ferric chloride, calcium chloride, platinum chloride, and chromium chloride whereupon chemical reaction takes place to form gaseous monochlorophthalic anhydride, condensing the gaseous monochlorophthalic anhydride to liquid form and recovering substantially pure liquid monochlorophthalic anhydride.

2. A process for producing monochlorophthalic anhydride which comprises passing a gaseous mixture of substantially equimolecular proportions of phthalic anhydride and chlorine over a thorium chloride catalyst at a temperature of about 300 to 400° C. whereupon chemical reaction takes place to form gaseous monochlorophthalic anhydride, condensing the gaseous monochlorophthalic anhydride to liquid form and recovering substantially pure liquid monochlorophthalic anhydride.

3. A process for producing monochlorophthalic anhydride which comprises passing a gaseous mixture of substantially equimolecular proportions of phthalic anhydride and chlorine over a cupric chloride catalyst at a temperature of about 300 to 400° C. whereupon chemical reaction takes place to form gaseous monochlorophthalic anhydride, condensing the gaseous monochlorophthalic anhydride to liquid form and recovering substantially pure liquid monochlorophthalic anhydride.

4. A process for producing monochlorophthalic anhydride which comprises passing a gaseous mixture of substantially equimolecular proportions of phthalic anhydride and chlorine over a ferric chloride catalyst at a temperature of about 250 to 300° C. whereupon chemical reaction takes place to form gaseous monochlorophthalic anhydride, condensing the gaseous monochlorophthalic anhydride to liquid form and recovering substantially pure liquid monochlorophthalic anhydride.

THAD M. AMACKER.

REFERENCES CITED

The following references are of record in the file of this patent:

UNITED STATES PATENTS

| Number | Name | Date |
| --- | --- | --- |
| 2,028,383 | Dvornikoff | Jan. 21, 1936 |
| 2,140,550 | Reilly | Dec. 20, 1938 |
| 2,429,985 | Blume et al. | Nov. 4, 1947 |